(12) United States Patent
Choe (10) Patent No.: US 6,263,357 B1
(45) Date of Patent: Jul. 17, 2001

(54) PARALLEL MULTIPLIER

(75) Inventor: Jeong-Ae Choe, Kyongsangbuk-do (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/150,174

(22) Filed: Sep. 9, 1998

(30) Foreign Application Priority Data

Mar. 4, 1998 (KR) .................................................... 98-7032

(51) Int. Cl.[7] ........................................................ G06F 7/52
(52) U.S. Cl. .............................................. 708/627; 327/408
(58) Field of Search .................................... 708/627, 625; 327/408, 409, 410

(56) References Cited

U.S. PATENT DOCUMENTS

| | | | | |
|---|---|---|---|---|
| 5,233,233 | * | 8/1993 | Inoue et al. | 327/408 |
| 5,465,226 | | 11/1995 | Goto | 364/757 |
| 5,784,011 | * | 7/1998 | Malladi | 708/627 |
| 5,805,477 | * | 9/1998 | Perner | 708/627 |
| 5,974,437 | * | 10/1999 | Johannsen | 708/627 |

* cited by examiner

*Primary Examiner*—David H. Malzahn
(74) *Attorney, Agent, or Firm*—Fleshner & Kim, LLP (57) ABSTRACT

A parallel multiplier includes m multiplexers and a plurality of adders. The multiplexers receive an n-bit multiplicand and n-bit zero (0) through two input terminals, respectively, and one (1) bit of a m-bit multiplier through a select terminal to selectively output the n-bit multiplicand when the one bit of the m-bit multiplier is "1" and the n-bit zero (0) when the one bit of the m-bit multiplier is "0". The adders receive two of the n-bit output data from the multiplexers to output an n+2 bit partial product or an n+m bit product by adding two neighboring output data from the multiplexers after 1 bit downshifting the (less significant) neighboring output data corresponding to the less significant bit of the m-bit multiplier. A final adder can output an n+m bit product by adding two (n+x bit) partial products after downshifting a selected one.

11 Claims, 9 Drawing Sheets

FIG.1

BACKGROUND ART

PARALLEL MULTIPLIER

BACKGROUND OF THE INVENTION

1. Field of the Invention

The present invention relates to a multiplier, and in particular, to a parallel multiplier, in which, for example, used as a multiplier block in a digital signal processor or a video data converter.

2. Background of the Related Art

In general, a multiplier comprises a plurality of basic cells having adders which are arranged in a two-dimensional plane.

Figure 1:
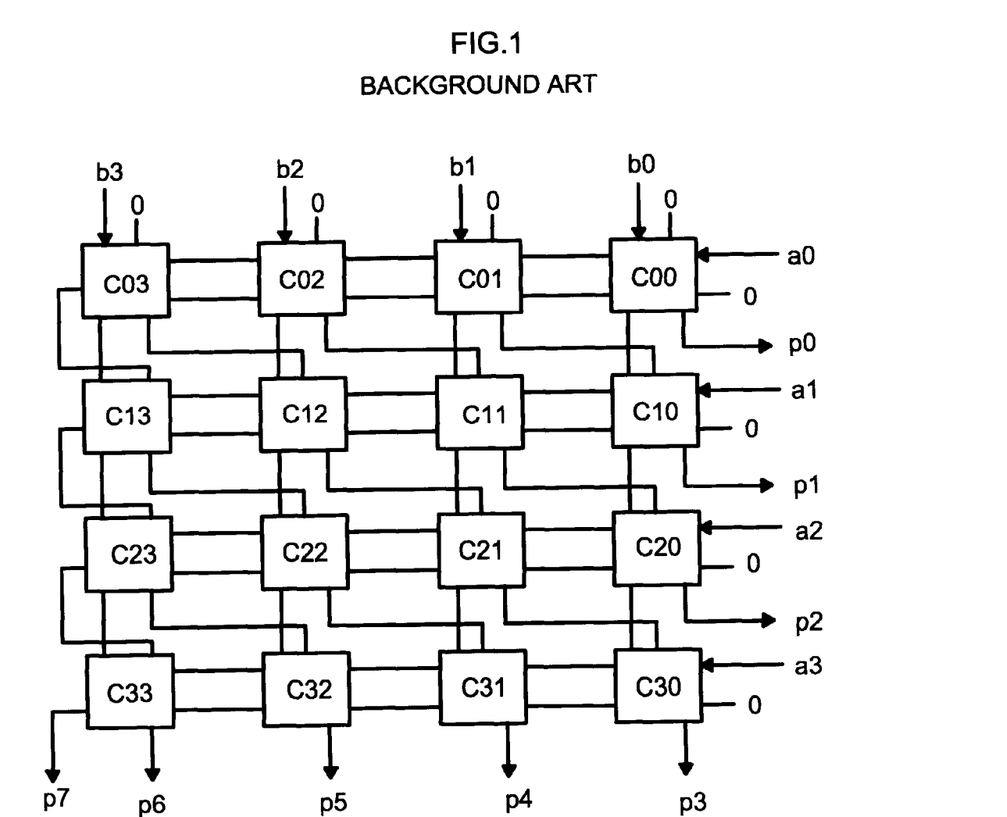
FIG. 1 is a block circuit diagram showing a related art 4×4 bit array multiplier.
Figure 2:
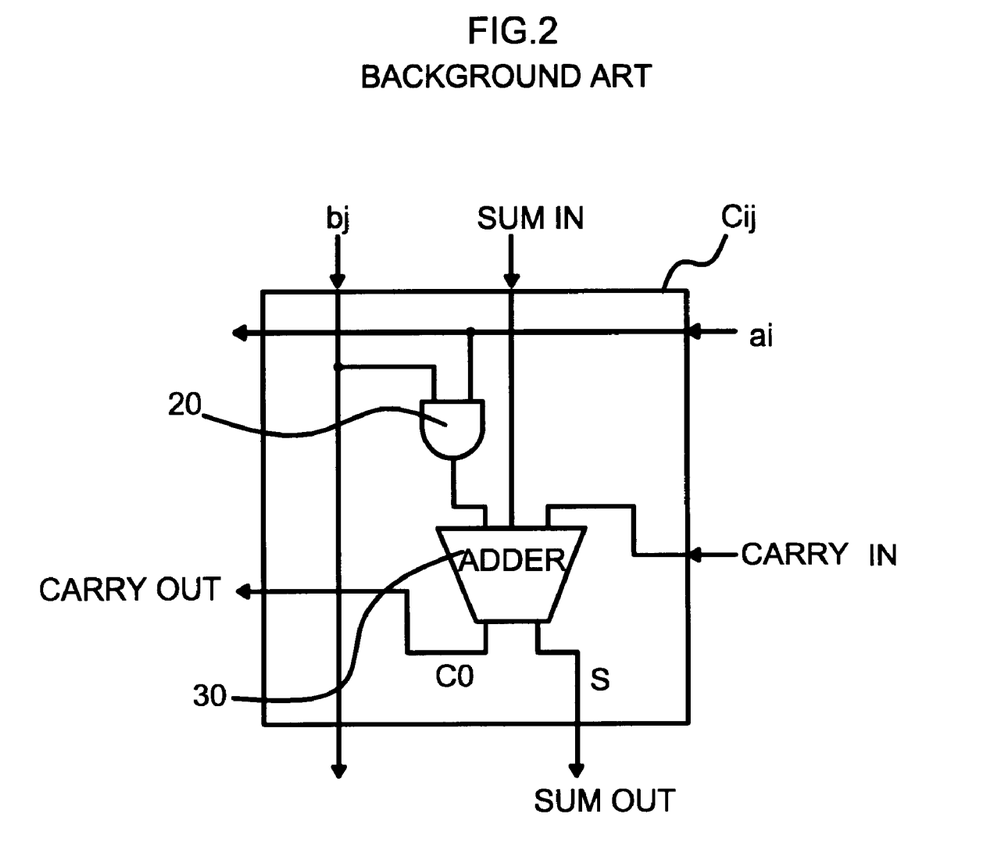
FIG. 2 is a detailed circuit diagram showing a basic cell in FIGS. 1, 3, and 4.

FIG. 1 is a block diagram showing a related art array multiplier using the basic cells. Cells C00–C33 have a matrix structure, and are supplied 4-bit multiplicand data a0–a3 and 4-bit multiplier data b0–b3 to produce 8-bit product data. FIG. 2 is the detailed circuit of basic cells in FIG. 1. A basic cell Cij transfers input data ai and bj to the next stage and add the two data to output a carry-out signal and a sum-out signal. ai and bj are applied a 1-bit multiplicand and a 1-bit multiplier, respectively. At this time, each input terminal of the sum-in and the carry-in of the cell C00 is applied the initial value 0. Referring to FIG. 1, the detailed operation of the related art array multiplier will be described as followings.

Cell C00 is applied a0, b0 and 0 as the initial value of a carry-in and a sum-in signal, respectively, and outputs a carry-out signal and a sum-out signal. C01 is applied a0 and the carry-out signal from C00 and C10 is applied a 1, 0 of the carry-in initial value, the sum-out signal from C01 and b0 to conduct an arithmetic operation. The other cells operate as aforementioned. The sum-out signals of cells C00, C10, C20, C30 located at the right end column produce the product data P0–P3. Also, the sum-out signals of cells C30, C31, C32, C33 located at the bottom row produce the product data P4–P7. That is, the related art array multiplier of FIG. 1 comprises a plurality of basic cells arranged in a two-dimensional plane and multiplies 4-bit binary multiplicand data a0–a3 by 4-bit binary multiplier data b0–b3 to produce 8-bit binary product data P0–P7.

The related art array multiplier uses a plurality of basic cells arranged in a two-dimensional plane and conducts ten steps of arithmetic operation. Therefore, there is a problem in the operating speed.

Figure 3:
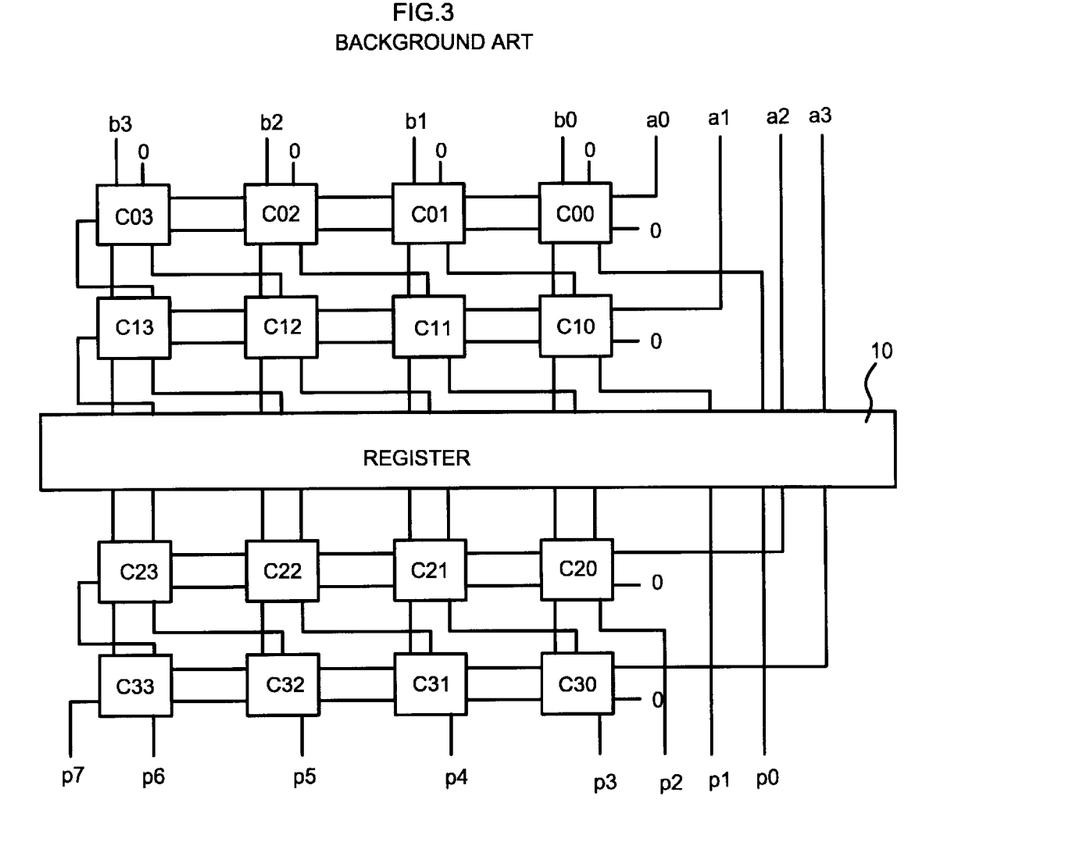
FIGS. 3 and 4 are block circuit diagrams showing another related art 4×4 bit array multipliers.
Figure 4:
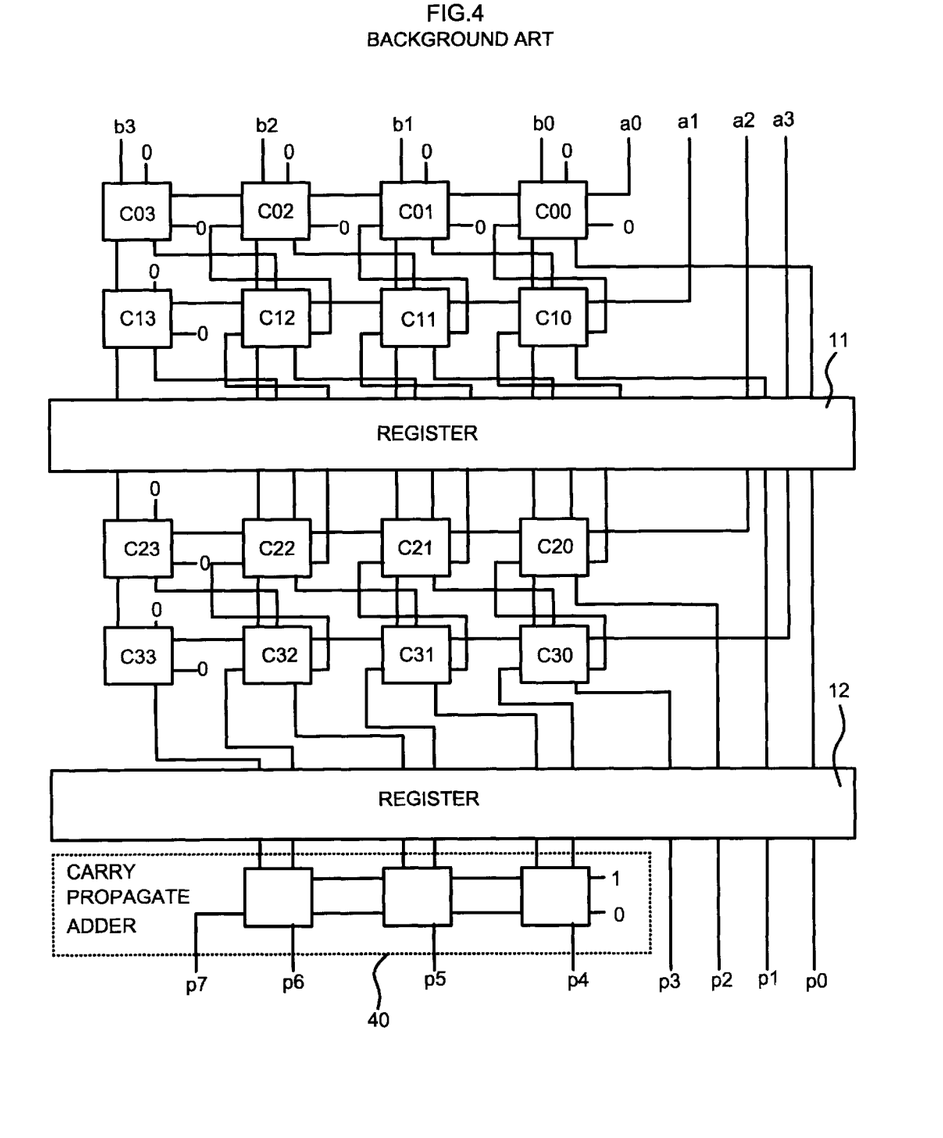

In order to solve the problem, FIGS. 3 and 4 show another related art array multiplier. The pipelined array multiplier of FIG. 3 has a register 10, and obtains a higher speed of operation than the multiplier of FIG. 1 by reducing the operating steps. However, due to the inserted register, the structure is more complex than the array multiplier of FIG. 1, and the required area is increased. Also, the pipelined array multiplier of FIG. 4 has two registers 11 and 12 and a carry propagate adder 40, and it is difficult to obtain a simple and high-integrated circuit. The cells in FIGS. 3 and 4 have the same structure as those in FIG. 1.

The publication "The Design And Analysis Of VLSI Circuits", which is published by Lance A. Glasser and Daniel W. Dobberpuhl, pages 52–55 describes the related art array multipliers of FIGS. 1, 3 and 4 in detail.

As described above, the related art array multipliers comprise a plurality of basic cell arranged in a two-dimensional plane and conduct a multi-step arithmetic operation, thereby having a problem that the operating speed is delayed. Also, registers may be used for a high-speed operation. But it makes the circuit complex and the required area increased.

SUMMARY OF THE INVENTION

An object of the present invention is to provide a parallel multiplier that substantially obviates one or more of the problems caused by limitations and disadvantages of the related art.

Another object of the present invention is to provide a parallel multiplier which has a simple structure.

A further object of the present invention is to provide a parallel multiplier which can a high degree of integration.

A further object of the present invention is to provide a parallel multiplier which can operates with high speed.

In order to achieve at least the above object in a whole or in parts, a parallel multiplier is provided according to the present invention that includes a plurality of selector being applied a multiplicand and each 1 bit data of a multiplier to selectively output the multiplicand or 0 according to said 1 bit data of the multiplier; and a plurality of adders being applied output data from said select selector to output a product by adding two neighboring output data from selector after 1 bit downshifting the lower bit output data.

To further achieve the above objects in a whole or in parts, there is provided a parallel multiplier according to the present invention that includes m multiplexers being applied an n bit multiplicand and n bit 0 through select-input terminals and each 1 bit data of a m bit multiplier through a select terminal to selectively output said n bit multiplicand if said 1 bit data is 1 or n bit 0 if 0; and a plurality of adders being applied said n bit output data from said multiplexers to output an n+m bit product by adding two neighboring output data from said multiplexers after 1 bit downshifting the lower bit output data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Referring to FIGS. 5 to 9, a preferred embodiment of the present invention will now be described.

Figure 5:
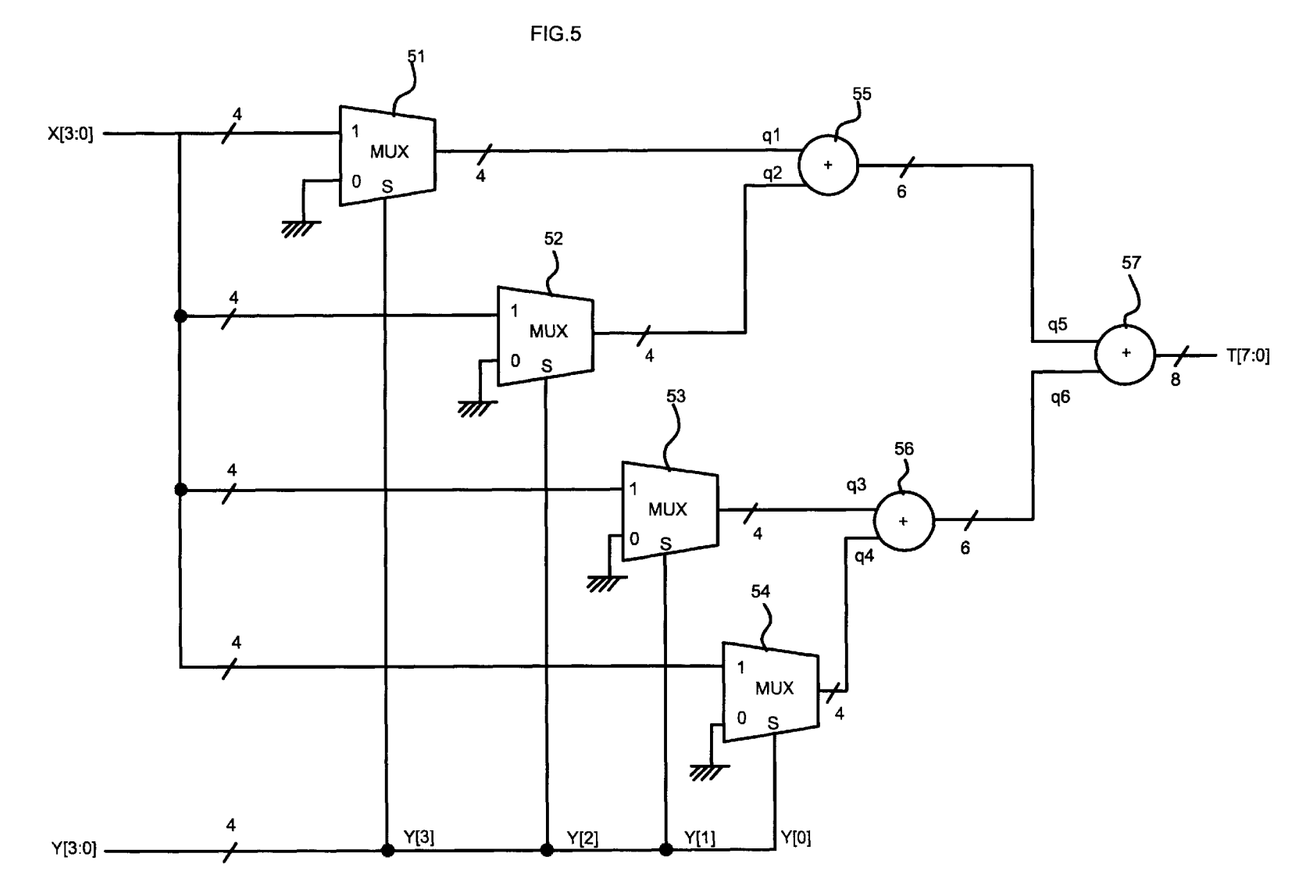
FIG. 5 is a block circuit diagram showing a 4×4 bit parallel multiplier according to a preferred embodiment of the present invention.

FIG. 5 shows a 4-bit parallel multiplier according to a preferred embodiment of the present invention. Mutiplexors 51 to 54 receive a 4-bit operand X[3:0](multiplicand), 0 and an 1-bit Y[n] of a 4-bit operand Y[3:0](multiplier) to output a 4-bit operand q[3:0], respectively. A first adder 55 receives a first operand q1[3:0] and a second operand q2[3:0] from the first and the second multiplexers 51 and 52, respectively, and adds the q1 and the 1-bit downshifted q2[3:0] to output a first partial sum q5[5:0]. Also, a second adder 56 receives a third operand q3[3:0] and a fourth operand q4[3:0] from the third and the fourth multiplexers 53 and 54, respectively, and adds the q3 and the 1-bit downshifted q4[3:0] to output a 6-bit second partial sum q6[5:0]. A third adder 57 receives the first partial sum q5[5:0] and the second partial sum q6[5:0] from the first adder 55, respectively, and adds the q5 and the 2-bit downshifted q6 to output the product T[7:0] of the multiplicand X[3:0] and the multiplier Y[3:0].

Figure 6:
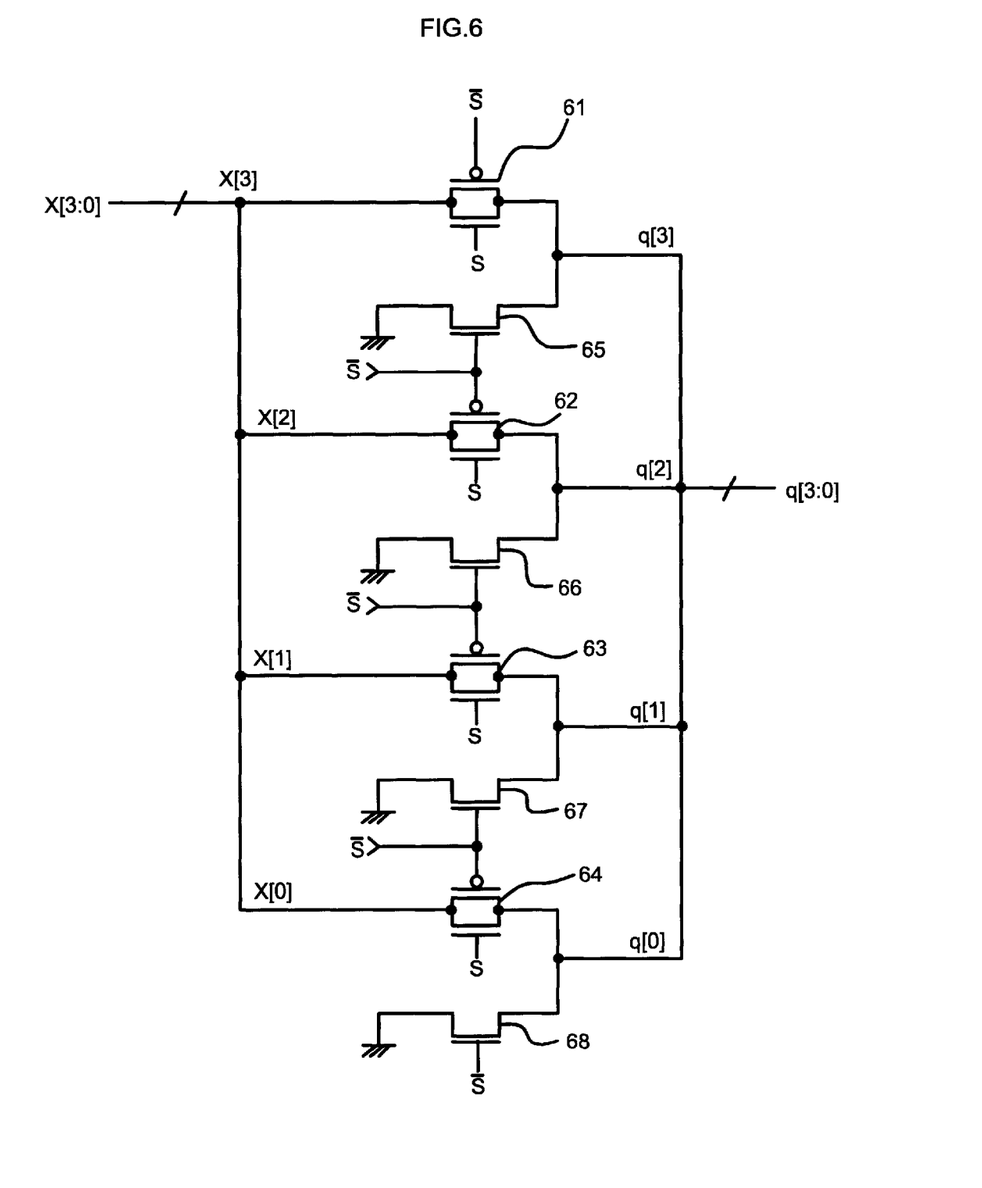
FIG. 6 is a detailed circuit diagram showing a multiplexer in FIG. 5.

The parallel multiplier of the present invention operates as described below. A first multiplexer 51 is applied X[3:0], the highest bit Y[3] of Y[3:0] and the reference value 0 through the 1-input terminal, the select terminal S and the 0-input terminal, respectively. A second to a fourth multiplexers 52 to 54 are applied X[3:0] and the reference value 0 through the 1-input terminal and the 0-input terminal, respectively. Also, they are applied Y[2], Y[1], Y[0] through the S terminal, respectively. FIG. 6 shows in more detail the circuit diagram of the first to the fourth multiplexers 51 to 54. A first to a fourth transition gates 61 to 64 are applied X[3], X[2], X[1] and X[0], respectively. Also, they are applied the inverted Y and Y through the gate terminals /S and S, respectively. Each of a first to a fourth transistors 65 to 68 is coupled to the ground and applied the inverted Y through the gate terminal.

In the operation of the first multiplexer 51, when the S terminal is applied Y[3], the first to the fourth transition gates 61 to 64 are switched to turn-on and the first operand q1[3:0] is outputted. At this time, if Y[3]=1, q1[3:0]=X[3:0] is output. On the other hand, if Y[3]=0, q1[3:0]=0000 is output. The operation of the second to the fourth multiplexers 52 to 54 is the same as the first multiplexer. For example, if X[3:0]=0101 and Y[3:0]=0011, the first multiplexer 51 is applied 0 for Y[3] through the S terminal, to output 0000 for q1[3:0]. The second multiplexer 52 is applied 0 for Y[2] through the S terminal, to output 0000 for q2[3:0]. The third multiplexer 53 is applied 1 for Y[1] through the S terminal, to output 0101 for q3[3:0]. The fourth multiplexer 54 is applied 1 for Y[0] through the S terminal, to output 0101 for q4[3:0].

Figure 7:
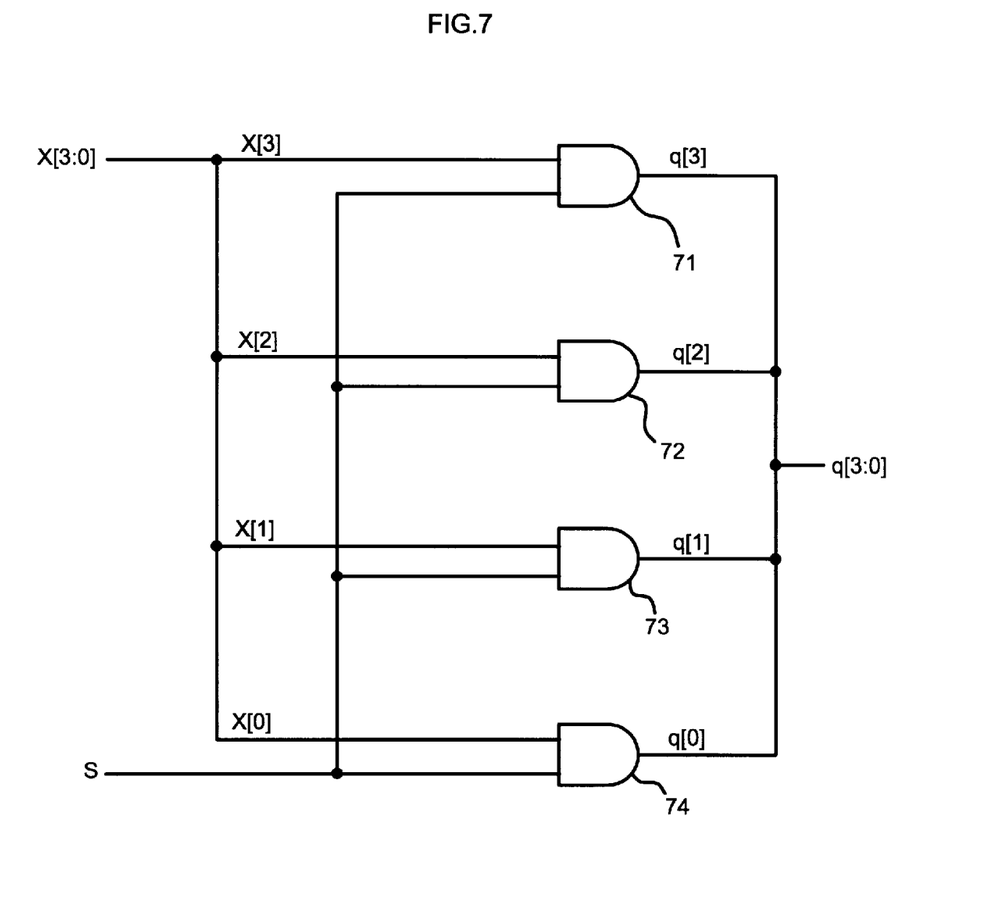
FIG. 7 is a detailed circuit diagram showing the multiplexer of FIG. 6 according to another embodiment.

FIG. 7 shows another embodiment of the first to the fourth multiplexers 51 to 54 using the AND gates 71 to 74 instead of the transition gates. The first to the fourth AND gates 71 to 74 are applied X[3], X[2], X[1], X[0] through a first input terminal and Y[3], Y[2], Y[1] or Y[0] through a second input terminal, respectively. When Y[3], Y[2], Y[1] or Y[0] is 1, q[n]=X[n](n=0–3). On the other hand, When Y[3], Y[2], Y[1] or Y[0] is 0, q[n]=0 regardless of the value for X[n]. If X[3:0]=0101 and Y[n]=0, q[3:0]=0000, and if Y[n]=1, q[3:0]=0101.

Next, the first adder 55 is applied q1[3:0] and q2[3:0] from the first and the second multiplexers 51 and 52, respectively, and adds q1[3:0] and the 1-bit downshifted q2[3:0] to output the first 6-bit partial sum.

Figure 8:
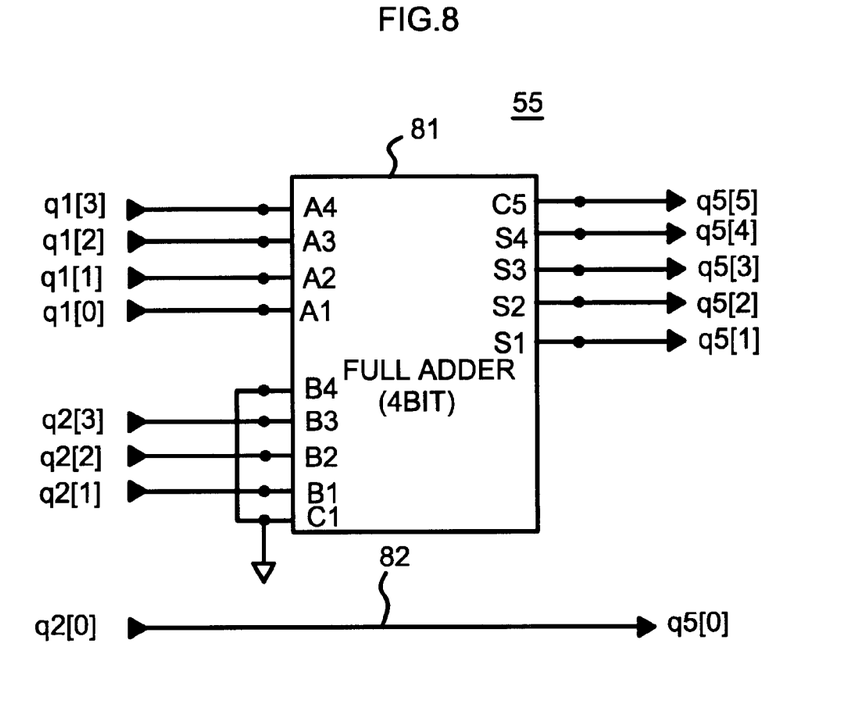
FIG. 8 is a detailed block circuit diagram showing a first and a second adder in FIG. 5.

FIG. 8 shows in more detail the first adder 55, which is a 4-bit full adder. Referring to FIG. 8, the first adder 55 comprises a full adder 81 and an 1-bit pass line 82. The full adder 81 is applied q1[3:0] through the A input terminals and q2[3:1] through the B input terminals, and adds the two data. Also, the full adder 55 passes q2[0] through the 1-bit pass line 82. Therefore, q2[0]=q5[0] is output. The first partial sum q5[5:0] can be obtained by the following formula (1).

$$
\begin{array}{r}
q1[3]\ q1[2]\ q1[1]\ q1[0] \\
+)\quad q2[3]\ q2[2]\ q2[1]\ q2[0] \\
\hline
q5[5]\ q5[4]\ q5[3]\ q5[2]\ q5[1]\ q5[0]
\end{array}
\quad\text{Formula (1)}
$$

As you can see in the Formula (1), the lower data q2[3] q2[2] q2[1] q2[0] is downshifted by 1 bit, and the first 6-bit partial sum q5[5:0] is obtained. The second adder 56 has the same structure of the first adder 55 as shown in FIG. 8 and can use the Formula (1) for the arithmetic results. That is, the second adder 56 is applied q3[3:0] and q4[3:0], and outputs the second 6-bit partial sum q6[5:0].

Next, the third adder 57 is applied the first partial sum q5[5:0] from the first adder 55 and the second partial sum q6[5:0] from the second adder 56, and add q5[5:0] and the 2-bit downshifted q6[5:0] to output the product T[7:0] of X[3:0] and Y[3:0].

Figure 9:
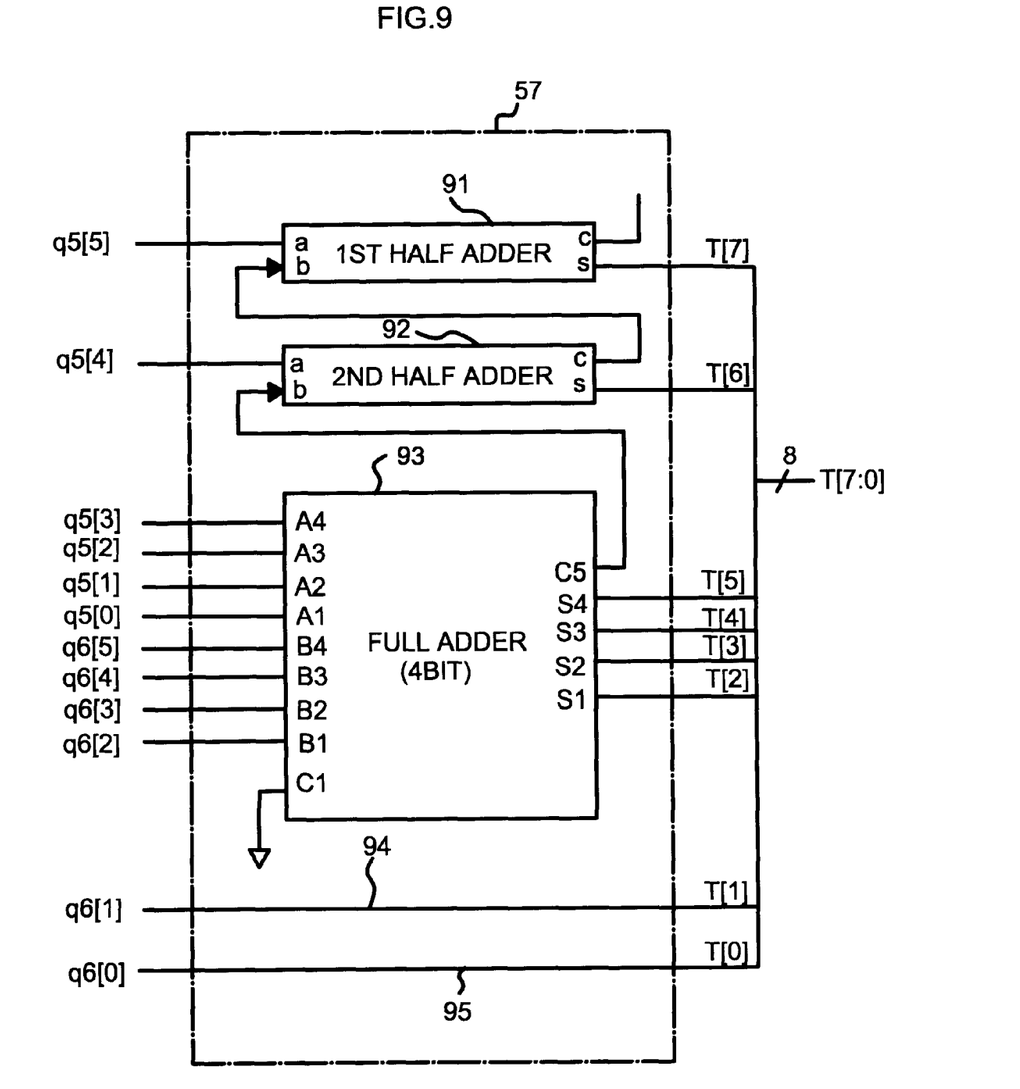
FIG. 9 is a detailed block circuit diagram showing a third adder in FIG. 5.

FIG. 9 shows in more detail the third adder 57, which is a 4-bit full adder. Referring to FIG. 9, the third adder 57 includes a full adder 93, a first 1-bit pass line 94 and a second 1-bit pass line 95. The full adder 93 is applied the first partial sum q5[3:0] through the A input terminal except two highest bits q5[5] and q5[4] and the second partial sum q6[5:2] through the B input terminal except two lowest bits q6[0] and q6[1], and adds the two data. At this time, the last carry from the full adder 93 is added to q5[4] in the second half adder 92, and T[6] is obtained. The carry from the second half adder 92 is added to q5[5] in the first half adder 91 and T[7] is obtained. Also, the full adder 93 passes q6[1] and q6[0] through the first 1-bit pass line 94 and the second 1-bit pass line 95, respectively. Therefore, q6[1]=T[1] and q6[0]=T[0] are applied. The product T[7:0] of X[3:0] and Y[3:0] can be obtained by the following formula (2).

$$
\begin{array}{r}
q5[5]\ q5[4]\ q5[3]\ q5[2]\ q5[1]\ q5[0] \\
+)\quad q6[5]\ q6[4]\ q6[3]\ q6[2]\ q6[1]\ q6[0] \\
\hline
T[7]\ T[6]\ T[5]\ T[4]\ T[3]\ T[2]\ T[1]\ T[0]
\end{array}
\quad\text{Formula (2)}
$$

As described above, in the parallel multiplier of the present invention, the multiplication of n-bit X and m-bit Y produces m n-bit partial sums by adding X[(N−1):0] and Y[m](m=1−(m−1)), and then produces the product T[(n+m−1):0] by adding two neighboring partial sums after downshifting the lower partial sum by 1 bit. If Y is an odd bit, the last adder adds the last partial sum and the result of the multiplexer for the lowest bit of Y[(m−1):0], Y[0], and produces the product T[(n+m−1):0].

As has been described hereinbefore, the present invention carries out a parallel multiplication using only multiplexers and adders without a plurality of cells and registers. Thereby, the present invention is remarkably effective for obtaining a high-speed operation and high degree of integration.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A parallel multiplier comprising:

a plurality of selectors each having first and second input terminals and a control input terminal, wherein each of the selectors receive a multibit multiplicand at the first input terminal, a zero (0) at the second input terminal and a single bit of a multiplier at the control input terminal, wherein the plurality of selectors are arranged in order to receive a least significant bit to a most significant bit of the multiplier;

a first group of adders connected to receive a plurality of multibit partial products from two or more adjacent selectors, wherein each of the first group of adders downshifts the at least one partial product corresponding to the less significant bit of the multiplier prior to adding the partial products;

a second group of adders sequentially arranged to receive outputs from two adjacent ones of the first group of adders or two adjacent ones of the second group of adders, wherein the output corresponding to the less significant bits of the multiplier are downshifted prior to addition by one of the second group of adders, wherein a product of the multiplicand and the multiplier is output by an adder in the second group of adders.

2. The parallel multiplier of claim 1, wherein a first selector receives the least significant bit of the multiplier and a last selector receives the most significant bit of the multiplier.

3. The parallel multiplier of claim 2, wherein if the multiplier has an odd number of bits, a last adder of the second adders adds the multibit partial product of the first selector and a first output.

4. The parallel multiplier of claim 1, wherein said selectors include a plurality of transition gates each coupled to receive 1 bit of said multibit multiplicand and a plurality of transistors coupled to a first prescribed voltage, and wherein each of the transition gates and transistors are controlled by the corresponding single bit of the multiplier received at the control input terminal.

5. The parallel multiplier of claim 1, wherein each of said selectors include a plurality of AND gates coupled in parallel that receive both a corresponding bit of the multibit multiplicand and the single bit of the multiplier received through the control input terminal.

6. A parallel multiplier that multiplies an N-bit multiplicand and an M-bit multiplier to output an (N+M)-bit product where N is an integer not less than two, comprising:

M multiplexers each connected to receive an N-bit multiplicand and an N-bit zero (0) through first and second input terminals, respectively, wherein each of the M multiplexers receives a corresponding single bit of the M-bit multiplier through a select terminal to selectively output an N-bit output signal being the N-bit multiplicand if the corresponding single bit data of the M-bit multiplier is a prescribed value and the N-bit zero (0) otherwise, and wherein the M multiplexers are sequentially ordered so that a first multiplexer receives a least significant bit of the M-bit multiplier and a last multiplexer receives the most significant bit of the M-bit multiplier;

a plurality of adders each connected to receive a corresponding one of the N-bit output signals to output N+2-bit output data, wherein each adder of the plurality of adders adds two N-bit output data from adjacent multiplexers after downshifting the N-bit output signal corresponding to a less significant bit of the M-bit multiplier; and a plurality of output adders each connected to receive output data from two adjacent ones of the plurality of adders or two adjacent ones of the output adders, wherein each of the output adders performs addition after downshifting the output data corresponding to less significant bits of the M-bit multiplier, wherein a final one of the output adders outputs the (N+M)-bit product.

7. The parallel multiplier of claim 6, wherein if the M-bit multiplier has an odd number of bits, a last adder of the plurality of output adders adds the N-bit output signal of the first multiplexer and a first output data.

8. The parallel multiplier of claim 6, wherein each of said selectors include a plurality of transition gates each coupled to receive 1 bit of said multibit multiplicand and a plurality of NMOS transistors coupled to a first prescribed voltage, and wherein each of the transition gates and transistors are controlled by the corresponding single bit of the multiplier received at the control input terminal.

9. The parallel multiplier of claim 6, wherein each of said selectors include a plurality of AND gates coupled in parallel that receive both a corresponding bit of the multibit multiplicand and the single bit of the multiplier received through the control input terminal.

10. The parallel multiplier of claim 6, wherein N is an integer greater than 2.

11. The parallel multiplier of claim 6, wherein N is an integer greater than 3.

* * * * *